(12) United States Patent
Chehab et al.

(10) Patent No.: US 12,037,661 B2
(45) Date of Patent: Jul. 16, 2024

(54) PROCESS FOR MANUFACTURING AN ALUMINUM ALLOY PART

(71) Applicant: C-TEC Constellium Technology Center, Voreppe (FR)

(72) Inventors: Bechir Chehab, Voiron (FR); Philippe Jarry, Grenoble (FR); Marine Ledoux, Grenoble (FR); Jocelyn Prigent, Grenoble (FR)

(73) Assignee: C-TEC Constellium Technology Center (FR)

( * ) Notice: Subject to any disclaimer, the term of this patent is extended or adjusted under 35 U.S.C. 154(b) by 0 days.

(21) Appl. No.: 16/612,045

(22) PCT Filed: Apr. 26, 2018

(86) PCT No.: PCT/FR2018/051066
§ 371 (c)(1),
(2) Date: Nov. 8, 2019

(87) PCT Pub. No.: WO2018/206876
PCT Pub. Date: Nov. 15, 2018

(65) Prior Publication Data
US 2021/0156005 A1    May 27, 2021

(30) Foreign Application Priority Data
May 12, 2017    (FR) ...................................... 1754212

(51) Int. Cl.
*C22C 1/04*        (2023.01)
*B22F 10/25*       (2021.01)
(Continued)

(52) U.S. Cl.
CPC ............ *C22C 1/0416* (2013.01); *B22F 10/25* (2021.01); *B22F 10/28* (2021.01); *B22F 10/64* (2021.01);
(Continued)

(58) Field of Classification Search
CPC ....... C22C 21/02; C22C 1/026; C22C 1/0416; B33Y 10/00; B33Y 70/00; B33Y 80/00;
(Continued)

(56) References Cited

U.S. PATENT DOCUMENTS 3,816,080 A * 6/1974 Bomford ............. C22C 32/0036
75/235
4,711,823 A * 12/1987 Shiina ................... F02F 7/0085
419/48
(Continued)

FOREIGN PATENT DOCUMENTS

EP    2 796 229 A1    10/2014
EP    3026135 A1     6/2016
(Continued)

OTHER PUBLICATIONS

Sun, Shaobo, et al., "Characterization of Al—Fe—V—Si heat-resistant aluminum alloy components fabricated by selective laser melting," J. Mater. Res., (2015) vol. 30, No. 1661-1669.
(Continued)

*Primary Examiner* — Janie M Loeppke
*Assistant Examiner* — Simpson A Chen
(74) *Attorney, Agent, or Firm* — McBee Moore & Vanik IP, LLC

(57) ABSTRACT

The invention relates to a process for manufacturing a part (20) comprising a formation of successive solid metal layers (201 . . . 20n), superimposed on one another, each layer describing a pattern defined from a numerical model (M), each layer being formed by the deposition of a metal (25), referred to as a filler metal, the filer metal being subjected to an input of energy so as to melt and constitute, by solidifying, said layer, wherein the filler metal takes the form of a powder (25), of which the exposure to an energy beam (32) results in a melting followed by a solidification in such a
(Continued)

way as to form a solid layer ($20_1, \ldots 20_n$), the method being characterized in that the filler metal (25) is an aluminum alloy comprising at least the following alloying elements:

Si, according to a weight fraction from 4% to 20%;

Fe, according to a weight fraction from 2% to 15%.

The invention also relates to a part obtained by this method. The alloy used in the additive manufacturing method according to the invention, makes it possible to obtain parts with remarkable mechanical performance, while still obtained a method of which the productivity is advantageous.

20 Claims, 2 Drawing Sheets

(51) Int. Cl.

| | | |
|---|---|---|
| *B22F 10/28* | (2021.01) | |
| *B22F 10/34* | (2021.01) | |
| *B22F 10/36* | (2021.01) | |
| *B22F 10/64* | (2021.01) | |
| *B22F 12/41* | (2021.01) | |
| *B23K 26/144* | (2014.01) | |
| *B23K 26/323* | (2014.01) | |
| *B23K 26/342* | (2014.01) | |
| *B23K 103/10* | (2006.01) | |
| *B33Y 10/00* | (2015.01) | |
| *B33Y 70/00* | (2020.01) | |
| *B33Y 80/00* | (2015.01) | |
| *C22C 1/02* | (2006.01) | |
| *C22C 21/02* | (2006.01) | |
| *C22F 1/043* | (2006.01) | |

(52) U.S. Cl.
CPC .......... *B23K 26/144* (2015.10); *B23K 26/323* (2015.10); *B23K 26/342* (2015.10); *B33Y 10/00* (2014.12); *B33Y 70/00* (2014.12); *B33Y 80/00* (2014.12); *C22C 1/026* (2013.01); *C22C 21/02* (2013.01); *C22F 1/043* (2013.01); *B22F 10/34* (2021.01); *B22F 10/36* (2021.01); *B22F 12/41* (2021.01); *B22F 2301/052* (2013.01); *B22F 2998/10* (2013.01); *B23K 2103/10* (2018.08)

(58) Field of Classification Search
CPC .. B23K 26/144; B23K 26/323; B23K 26/342; B23K 2103/10; B22F 10/28; B22F 2301/052; B22F 2998/10; C22F 1/043
USPC ....................................................... 219/76.1
See application file for complete search history.

(56) References Cited

U.S. PATENT DOCUMENTS

| | | | | |
|---|---|---|---|---|
| 4,743,317 | A | * | 5/1988 | Skinner .................. C22C 45/08 148/437 |
| 4,758,273 | A | * | 7/1988 | Gilman ............... C22C 32/0036 75/249 |
| 2009/0041616 | A1 | * | 2/2009 | Takagi .................. C22C 1/0491 420/551 |
| 2015/0167130 | A1 | * | 6/2015 | Steinwandel ............. B22F 3/20 420/420 |
| 2016/0138400 | A1 | | 5/2016 | Karabin et al. |
| 2017/0016096 | A1 | * | 1/2017 | Wentland ............... B33Y 10/00 |
| 2017/0120393 | A1 | | 5/2017 | Lin et al. |
| 2020/0056269 | A1 | * | 2/2020 | Choi ........................ C22C 21/00 |

FOREIGN PATENT DOCUMENTS

| | | |
|---|---|---|
| FR | 2 969 176 A1 | 6/2012 |
| WO | 2015/006447 A1 | 1/2015 |
| WO | 2016/209652 A1 | 12/2016 |
| WO | 2018119283 A1 | 6/2018 |
| WO | WO-2018119283 A1 * 6/2018 | ............ B22F 3/1055 |

OTHER PUBLICATIONS

Sun, Shaobo, et al., "Microstructure and mechanical properties of Al—Fe—V—Si aluminum alloy produced by electron beam melting," Materials Science & Engineering, (2016) vol. A, No. 659 207-214.

PCT International Search Report for PCT/FR2018/051066, mailed Jul. 9, 2018.

Enomoto, et al., "Surface Treatment of Aluminum Alloy with Laser Irradition to Increase Wear Resistance," Materials Science Forum, (2007), vols. 539-543: 404-410.

Pan Ma, et al., "Microstructure and phase formation in Al—20Si—5Fe—3Cu—I Mg synthesized by selective laser melting," Journal of Alloys and Compounds, (2016), vol. 657, 430-435.

Wang Feng, et al., "Microstructure and mechanical properties of spray-deposited Al—Si—Fe—Mn—Cu—Mg alloys," Journal of Aeronautical Materials, (2001), vol. 21, No. 1: 23-26.

Jianye Wang and L. Vandeperre, "Chapter 10.4: Hardness and Yield Strength," Deformation and Hardness of UHTCs as a Function of Temperature, (2014), 250-252.

"The direction of development of aluminum alloys," Engineering Materials, (1999), 206-209.

"Standard Terminology for Additive Manufacturing—General Principles—Terminology," International Organization for Standardization, (2016).

* cited by examiner

PROCESS FOR MANUFACTURING AN ALUMINUM ALLOY PART

CROSS-REFERENCE TO RELATED APPLICATIONS

This application is the National Stage entry of International Application No. PCT/FR2018/051066, filed 26 Apr. 2018, which claims priority to France No. 1754212, filed 12 May 2017.

BACKGROUND

Technical Field

The technical field of the invention is a method for manufacturing an aluminum alloy part, implementing an additive manufacturing technique.

Description of Related Art

Additive manufacturing techniques have been developing since the 1980s. These techniques consist of forming a part by adding material, as opposed to machining techniques, which aim to remove material. Formerly confined to prototyping, additive manufacturing is now operational in the serial manufacture of industrial products, including metal parts.

The term "additive manufacturing" is defined according to the French standard XP E67-001 as a "set of processes making it possible to manufacture, layer by layer, by adding material, a physical object from a digital object". Standard ASTM F2792 (January 2012) also defines additive manufacturing. Different additive manufacturing methods are also defined and described in standard ISO/ASTM 17296-1. The use of additive manufacturing to produce an aluminum part with low porosity has been described in the patent document WO2015/006447. The application of successive layers is generally carried out by applying a so-called filler material, then by melting or sintering the filler material using a laser beam, electron beam, plasma torch or electric arc type energy source. Whatever the additive manufacturing method applied, the thickness of each added layer is equal to about several tens or hundreds of microns.

An additive manufacturing technique is the melting or the sintering of a filler material taking the form of a powder. This can be melting or sintering by an energy beam.

In particular are known the techniques selective sintering via laser (selective laser sintering, SLS or direct metal laser sintering, DMLS), wherein a layer of metal powder or of metal alloy is applied to a part to be manufactured and is selectively sintered according to the numerical model with thermal energy from a laser beam. Another type of method for forming metal comprises the selective melting by laser (SLM) or electron beam melting (EBM), wherein the thermal energy supplied by a laser or a directed electron beam is used to selectively melt (instead of sinter) the metal powder so that it fusions as it cools and solidifies.

Also known is laser melting deposition (LMD) wherein the powder is sprayed and melted by a laser beam simultaneously.

Patent application WO2016/209652 describes a method for manufacturing an aluminum with high mechanical resistance comprising: the preparing of an atomized aluminum powder that has one or several approximate powder sizes desired and an approximate morphology; the sintering of the powder to form a product by additive manufacturing; solution heat treatment; quenching; and the aging of the aluminum manufactured in an additive manner.

The patent application US2017/0016096 discloses a method for manufacturing a part by localized melting obtained in particular by exposing a powder to an energy beam of the electron beam or laser beam type, the powder being formed by an aluminum alloy having a copper content that lies in the range 5 wt. % to 6 wt. %, with the magnesium content whereof lying in the range 2.5 wt. % to 3.5 wt. %.

Patent application EP2796229 discloses a method for forming a metal aluminum alloy reinforced with dispersion comprising the steps of: obtaining, in the form of powder, an aluminum alloy composition which is able to acquire a microstructure reinforced by dispersion; directing a low-density energy laser beam on a portion of the powder that that the alloy composition; removing the laser beam from the portion of the powder alloy composition; and cooling the portion of the powder alloy composition at a speed that is greater than or equal to about $10^{6\circ}$ C. per second, to thus form the aluminum metal alloy reinforced by dispersion. The method is particularly adapted for an alloy that has a composition according to the following formula: $Al_{comp}Fe_4Si_bX_c$, wherein X represents at least one element chosen from the group comprising Mn, V, Cr, Mo, W, Nb and Ta; "a" ranges from 2.0 to 7.5% in atoms; "b" ranges from 0.5 to 3.0% in atoms; "c" ranges from 0.05 to 3.5% in atoms; and the complement is aluminum and accidental impurities, with the condition that the [Fe+Si]/Si ratio is in the range of about 2.0:1 to 5.0:1.

Patent application EP3026135 describes a molding alloy comprising 87 to 99 parts by weight of aluminum and of silicon, 0.25 to 0.4 parts by weight of copper and 0.15 to 0.35 parts by weight of a combination of at least two elements from among Mg, Ni and Ti. This molding alloy is adapted to be sprayed by an inert gas in order to form a powder, the powder being used to form an object by laser additive manufacturing, the object then subjected to an aging treatment.

U.S. Patent application 2016/0138400 describes alloys that comprise from 3 to 12% by weight of iron, from 0.1 to 3% by weight of vanadium, from 0.1 to 3% by weight of silicon and from 1 to 6% by weight of copper, with the remainder aluminum and impurities, suitable for additive manufacturing techniques.

The publication "Characterization of Al—Fe—V—Si heat-resistant aluminum alloy components fabricated by selective laser melting", Journal of Material Research, Vol. 30, No. 10, May 28, 2015, describes the manufacturing by SLM of heat-resistance components of composition, as % by weight, Al-8.5Fe-1.3V-1.7Si.

The publication "Microstructure and mechanical properties of Al—Fe—V—Si aluminum alloy produced by electron beam melting", Materials Science & Engineering A659 (2016)207-214, describes pieces of the same alloy as in the preceding article obtained by EBM.

The mechanical properties of the aluminum parts obtained by additive manufacturing depend on the alloy forming the filler metal, and more precisely on the composition thereof, on the parameters of the method of additive manufacturing as well as on the heat treatments applied. The inventors have determined an alloy composition which, when used in an additive manufacturing method, enables parts with remarkable mechanical performance levels to be obtained, while still obtaining a method of which the productivity is advantageous. In particular, the parts obtained have characteristics that are equivalent and even improved in relation to prior art (in particular an alloy 8009), for example in terms of porosity and/or of hardness. Likewise, thanks to this invention, the method is optimized and the productivity improved. For example, it is possible to decrease the energy density and/or to increase the speed during the use of the alloy according to this invention, in relation to what is possible with an alloy of prior art, in particular an alloy 8009.

SUMMARY

A first purpose of the invention is to propose a method for manufacturing a part including a formation of successive solid metal layers, superimposed on one another, each layer describing a pattern defined from a numerical model, each layer being formed by the deposition of a metal, referred to as a filler metal, the filler metal being subjected to an input of energy so as to melt and constitute, by solidifying, said layer, wherein the filler metal takes the form of a powder, of which the exposure to an energy beam results in a melting followed by a solidification in such a way as to form a solid layer, the method being characterized in that the filler metal is an aluminum alloy comprising at least the following alloying elements:

Si, according to a weight fraction from 4% to 20%;
Fe, according to a weight fraction from 2% to 15%.

The addition of such a silicon content to an alloy containing iron makes it possible to obtain a part with improved hardness and an advantageous granular structure that in particular decreases the risk of cracking, which is in particularly advantageous for certain applications, for example aeronautics. That is why it is preferable that the weight fraction of silicon be at least 5% and more preferably at least 6%. A maximum weight fraction of silicon preferred is 15% even 13%. A minimum weight fraction of iron preferred is 3% and in a preferred manner 6%. A maximum weight fraction of iron preferred is 12%.

The alloy can also comprise at least one, even at least two elements or even at least three elements chosen from among:
Mn, according to a weight fraction from 0.1% to 5%, preferably at most 2% and in a preferred manner at most 1%;
Ti, according to a weight fraction from 0.01% to 5%, preferably at least 0.1%, preferably at most 2% and in a preferred manner at most 1%;
V, according to a weight fraction from 0.1% to 5%, preferably at most 3% and in a preferred manner at most 2%;
Zr, according to a weight fraction from 0.05% to 5%, preferably at least 0.1%, preferably at most 3% and in a preferred manner at most 2%;
Cr, according to a weight fraction from 0.05% to 5%, preferably at least 0.1%, preferably at most 3% and in a preferred manner at most 2%;
Hf, according to a weight fraction from 0.05% to 5%, preferably at least 0.1%, preferably at most 3% and in a preferred manner at most 2%.

These elements can result in the formation of dispersoids or thin intermetallic phases enabling the hardness of the material obtained to be increased.

The alloy can also comprise at least one, even at least two elements or even at least three elements chosen from among:
Ag, according to a weight fraction from 0.1 to 1%;
U, according to a weight fraction from 0.1 to 2%, more preferably from 0.5 to 1.2%;
Zn, according to a weight fraction from 0.1 to 1%.

The Ag, Zn and U elements can act on the strength of the material by precipitation hardening or by the effect thereof on the properties of the solid solution.

The alloy can further include Mg according to a weight fraction from 0.1 to 7% and preferably from 0.5 to 5%.

Optionally, at least one element can be added, chosen from W, Nb, Ta, Y, Yb, Nd, Er, with a weight fraction of at least 0.1% and at most 5%, preferably at most 3%, and in a preferred manner at most 2%, so as to form additional dispersoids or thin intermetallic phases.

Optionally, at least one element can be added, chosen from Co and Ni with a weight fraction of at least 0.1% and of at most 7%. Advantageously of at least 3% and in a preferred manner of at least 4%, in such a way as to form more dispersoids or thin intermetallic phases.

Optionally, at least one element can be added, chosen from La, Ce or mishmetal, with a weight fraction of at least 0.1% and of at most 12%, preferably of at most 6%, preferably at most 3%, and in a preferred manner at most 2%.

Optionally, at least one element can be added, chosen from Bi, Sr, Ba, Ca, Sb, P and B, with a weight fraction of at least 0.01% and of at most 1%, and more preferably of at least 0.05% and of at most 0.8%. However in an embodiment the addition of Bi is avoided, the preferred weight fraction then being less than 0.05%, and more preferably less than 0.01%.

The material includes a weight fraction of other elements or impurities of less than 0.05 wt. %, i.e. 500 ppm. The cumulative weight fraction of the other elements or impurities is less than 0.15 wt. %.

The remainder of the material is aluminum since this is an aluminum alloy.

In a preferred embodiment of the invention, the aluminum alloy consists in, as a weight fraction, at least 5% and at most 8% and more preferably at least 6% and at most 7% of Si, at least 6% and at most 10% and more preferably at least 8% and at most 9% of Fe, at least 1% and at most 1.5% and more preferably at least 1.1% and at most 1.4% of V, and at most 0.5% and more preferably at least 0.05% and at most 0.3% of Mn, other elements or impurities less than 0.05%, the total weight fraction of the other elements or impurities being less than 0.15%, the remainder being aluminum.

According to one embodiment, the method can include, after the formation of the layers:
solution heat treatment followed by quenching and aging, or
heat treatment generally at a temperature of at least 100° C. and at most 400° C.,
and/or hot isostatic compression (HIP).

Heat treatment can in particular enable the residual stresses to be dimensioned, and/or additional precipitation of the hardening phases.

HIP treatment can in particular enable the elongation properties and fatigue properties to be improved. Hot isostatic compression can be carried out before, after or instead of the heat treatment.

Advantageously, hot isostatic compression is carried out at a temperature from 250° C. to 550° C. and more preferably from 300° C. to 450° C., at a pressure from 500 to 3000 bars and for a duration from 0.5 to 10 hours.

The heat treatment and/or the hot isostatic compression makes it possible in particular to increase the hardness of the product obtained.

According to another embodiment, adapted to age hardening alloys, solution heat treatment can be carried out, followed by quenching and aging of the part formed and/or hot isostatic compression. Hot isostatic compression can, in such a case, advantageously replace the solution heat treatment. However, the method according to the invention is advantageous since it preferably does not require any solution heat treatment followed by quenching. The solution heat treatment can be detrimental to the mechanical strength in certain cases by contributing to the magnification of the dispersoids or thin intermetallic phases.

According to one embodiment, the method according to the present invention optionally further includes machining treatment, and/or chemical, electrochemical or mechanical surface treatment, and/or tribofinishing. These treatments can be carried out in particular in order to reduce roughness and/or improve corrosion resistance and/or improve resistance to fatigue crack initiation.

Optionally, it is possible to carry out a mechanical deformation of the part, for example after additive manufacturing and/or before heat treatment.

A second purpose of the invention is to propose a metal part, obtained by method according to the first purpose of the invention.

A third purpose of the invention is a powder comprising, preferably consisting of, an aluminum alloy comprising at least the following alloying elements:
Si, according to a weight fraction from 4% to 20%;
Fe, according to a weight fraction from 2% to 15%.
The aluminum alloy of the powder according to this invention can also include:
optionally at least on element chosen from:
  Mn, according to a weight fraction from 0.1% to 5%, preferably at most 2% and in a preferred manner at most 1%;
  Ti, according to a weight fraction from 0.01% to 5%, preferably at least 0.1%, preferably at most 2% and in a preferred manner at most 1%;
  V, according to a weight fraction from 0.1% to 5%, preferably at most 3% and in a preferred manner at most 2%;
  Zr, according to a weight fraction from 0.05% to 5%, preferably at least 0.1%, preferably at most 3% and in a preferred manner at most 2%;
  Cr, according to a weight fraction from 0.05% to 5%, preferably at least 0.1%, preferably at most 3% and in a preferred manner at most 2%;
  Hf, according to a weight fraction from 0.05% to 5%, preferably at least 0.1%, preferably at most 3% and in a preferred manner at most 2%.
optionally at least on element chosen from:
  Ag, according to a weight fraction from 0.1 to 1%;
  Li, according to a weight fraction from 0.1 to 2%, more preferably from 0.5 to 1.2%;
  Zn, according to a weight fraction from 0.1 to 1%.
optionally the element Mg according to a weight fraction from 0.1 to 7% and preferably from 0.5 to 5%.
optionally at least on element chosen from:
  W, Nb, Ta, Y, Yb, Nd, Er, with a fraction of at least 0.1% and of at most 5% more preferably of at most 3% and in a preferred manner at most 2%.
optionally at least on element chosen from Co and Ni with a weight fraction of at least 0.1% and of at most 7%.
optionally at least on element chosen from
  La, Ce or mishmetal, with a weight fraction of at least 0.1% and of at most 12%, preferably of at most 6% more preferably of at most 3% and in a preferred manner at most 2%.
optionally at least on element chosen from
  Bi, Sr, Ba, Ca, Sb, P and B, with a weight fraction of at least 0.01% and of at most 1% and more preferably of at least 0.05% and of at most 0.8%.

The material of the powder according to this invention comprises a weight fraction in other elements or impurities less than 0.05%, or 500 ppm. The total weight fraction in other elements or impurities is less than 0.15%.

The remainder of the material of the powder according to this invention is aluminum since it is an aluminum alloy.

In a preferred embodiment of the invention, the aluminum alloy of the powder according to this invention consists of, as a weight fraction, at least 5% and at most 8% and more preferably at least 6% and at most 7% of Si, at least 6% and at most 10% and more preferably at least 8% and at most 9% of Fe, at least 1% and at most 1.5% and more preferably at least 1.1% and at most 1.4% of V, and at most 0.5% and more preferably at least 0.05% and at most 0.3% of Mn, other elements or impurities less than 0.05%, the total weight fraction of the other elements or impurities being less than 0.15%, the remainder being aluminum.

Other advantages and features will more clearly emerge from the following description and non-limiting examples, shown in the figures listed below.

DETAILED DESCRIPTION OF A PREFERRED EMBODIMENT

In the description, unless stated otherwise:
the designation of the aluminum alloys is compliant with the nomenclature laid down by The Aluminum Association;
the chemical element contents are denoted as a weight percentage and represent weight fractions.

Figure 1:
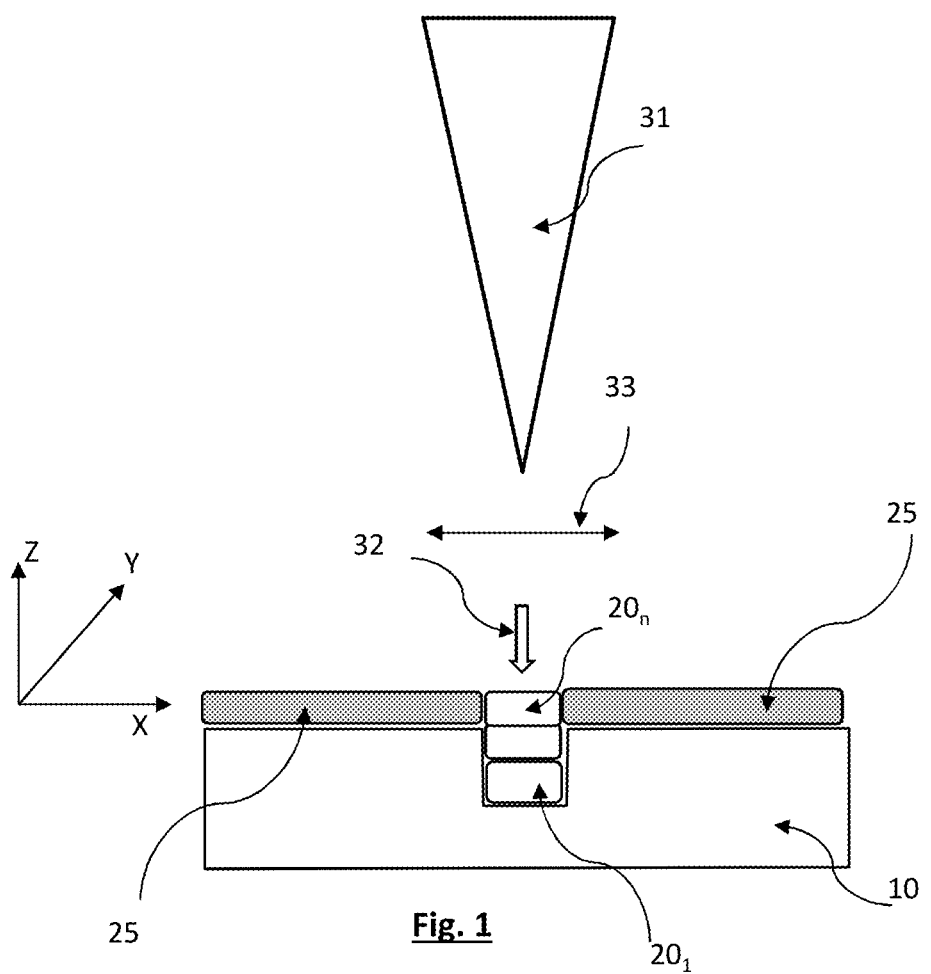
FIG. 1 is a diagram showing an additive manufacturing method of the SLM, or EBM type.

FIG. 1 generally describes an embodiment, wherein the additive manufacturing method according to the invention is implemented. According to the method, the filler material 25 has the form of an alloyed powder according to the invention. An energy source, for example a laser source of an electron source 31, emits an energy beam for example a laser beam or an electron beam 32. The energy source is coupled to the filler material by an optical system or electromagnetic lenses 33, with the movement of the beam thus able to be determined as a function of a numerical model M. The laser beam 32 follows a movement along the longitudinal plane XY, describing a pattern that is dependent on the numerical model M. The powder 25 is deposited onto a support 10. The interaction of the laser beam 32 with the powder 25 causes selective melting of the latter, followed by solidification, resulting in the formation of a layer $20_1 \ldots 20_n$. When a layer has been formed, it is coated in powder 25 of the filler metal and another layer is formed, superimposed on the previously formed layer. The thickness of the powder forming a layer can for example be from 10 to 100 μm. The method of additive manufacturing is typically known as selective laser melting (SLM) when the energy beam is a laser beam, with the method in this case advantageously being executed at atmospheric pressure, and under the name electron beam melting (EBM) when the energy beam is an electron beam, with the method is this case advantageously being executed at a reduced pressure, typically less than 0.01 bar and more preferably less than 0.1 mbar. In the case of selective laser melting, the speed V of the movement of the laser beam expressed in mm/s and the local energy or energy density E expressed in J/mm$^3$ are advantageously such that E>0.2 V−35 in such a way as to obtain layers of low porosity, with the speed V being at least 180 mm/s. In an advantageous embodiment, which makes it possible in particular to obtain layers of low porosity at a higher speed or with a lower energy than with the alloys according to prior art, E<0.3 V+30, with the speed V being at least 180 mm/s.

In another embodiment, the layer is obtained by selective laser sintering (SLS) or direct metal laser sintering (DMLS), with the layer of alloyed powder according to the invention being selectively sintered according to the numerical model chosen with the thermal energy supplied by a laser beam.

In yet another embodiment not described in FIG. 1, the powder is sprayed and melted simultaneously by beam that is generally laser. This method is known under the name of laser melting deposition.

Other methods can be used, in particular those known under the names of Direct Energy Deposition (DED), Direct Metal Deposition (DMD), Direct Laser Deposition (DLD), Laser Deposition Technology (LDT), Laser Metal Deposition (LMD), Laser Engineering Net Shaping (LENS), Laser Cladding Technology (LCT), or Laser Freeform Manufacturing Technology (LFMT).

In an embodiment, the method according to the invention is used to realize a hybrid part comprising a portion 10 obtained by conventional methods of rolling and/or spinning and/or molding and/or forging optionally followed by machining and an integral portion 20 obtained by additive manufacturing. This embodiment can also be suitable for the repair of parts obtained by the conventional methods.

It is also possible, in an embodiment of the invention, to use the method according to the invention for the repair of parts obtained by additive manufacturing.

The metal parts 20 obtained by a method according to the invention advantageously have, in the raw state of manufacture, a Vickers Hardness Hv0.1 of at least 160 and preferably at least 170 or even at least 180. The Vickers Hardness can in particular be determined by following the method described in standards EN ISO 6507-1 (Metallic materials—Vickers hardness test—Part 1: Test method), EN ISO 6507-2 (Metallic materials—Vickers hardness test—Part 2: Verification and calibration of testing machines), EN ISO 6507-3 (Metallic materials—Vickers hardness test—Part 3: Calibration of reference blocks) and EN ISO 6507-4 (Metallic materials—Vickers hardness test—Part 4: Tables of hardness values).

The powder according to this invention can have at least one of the following characteristics:
  average particle size from 10 to 100 μm, more preferably from 20 to 60 μm;
  spherical shape. The sphericity of a powder can for example be determined by using a morphogranulometer;
  good flowability. The flowability of a powder can for example be determined according to the standard ASTM B213;
  low porosity, more preferably from 0 to 5%, more preferentially from 0 to 2%, even more preferentially from 0 to 1% by volume. The porosity can in particular be determined by scanning electron microscopy or by helium pycnometry (see the standards ASTM B923);
  absence or low quantity (less than 10%, more preferably less than 5% by volume) of small particles (1 to 20% of the average size of the powder), referred to as satellites, which adhere to the largest particles.

The powder according to this invention can be obtained by conventional atomization methods using an alloy according to the invention in liquid or solid form or, alternatively, the powder can be obtained by mixing primary powders before exposure to the energy beam, with the various compositions of the primary powders having an average composition that corresponds to the composition of the alloy according to the invention.

It is also possible to add infusible nanometric particles, for example oxides or $TiB_2$ particles or carbon nanoparticles, before the preparation of the powder by the atomization and/or during the deposition of the powder and/or during the mixture of the primary powders.

The powder according to this invention can be obtained for example by spraying by a stream of gas, plasma spraying, spraying by stream of water, spraying by ultrasound, spraying by centrifugation, electrolysis and spheroidizing, or grinding and spheroidizing.

More preferably, the powder according to this invention is obtained by atomization by a stream of gas. The method of spraying by a stream of gas starts with the flow of a melted metal through a nozzle. The melted metal is then reached by streams of neutral gases, such as nitrogen or argon, and atomized into very small droplets that cool and solidify by falling inside a spraying tower. The powders are then collected in a tin. The method of spraying via a stream of gas has the advantage of producing a powder that has a spherical shape, contrary to spraying by a stream of water which produces a powder having an irregular shape. Another advantage of spraying via a stream of gas is a good powder density, in particular thanks to the spherical shape and the distribution of the particle size. Yet another advantage of this method is good reproducibility of the distribution the particle size.

After the manufacture thereof, the powder according to this invention can be steamed, in particular so as to reduce its humidity. The powder can also be packaged and stored between its manufacture and its use.

The powder according to this invention can in particular be used in the following applications:
  Selective Laser Sintering (SLS);
  Direct Metal Laser Sintering (DMLS);
  Selective Heat Sintering (SHS);
  Selective Laser Melting (SLM);
  Electron Beam Melting (EBM);
  Laser Melting Deposition;
  Direct Energy Deposition (DED);
  Direct Metal Deposition (DMD);
  Direct Laser Deposition (DLD);
  Laser Deposition Technology (LDT);
  Laser Engineering Net Shaping (LENS);
  Laser Cladding Technology (LCT);
  Laser Freeform Manufacturing Technology (LFMT);
  Laser Metal Deposition (LMD);
  Cold Spray Consolidation (CSC);
  Additive Friction Stir (AFS);
  Field Assisted Sintering Technology (FAST) or spark plasma sintering); or
  Inertia Rotary Friction Welding (IRFW).

The invention shall be described in more detail in the example hereinafter.

The invention is not limited to the embodiments described in the description hereinabove of in the examples hereinafter, and can vary widely within the scope of the invention such as defined by the claims attached to this description.

Example

In this example parts were elaborated using the SLM method described hereinabove.

Powders in alloy 8009 and alloyed according to the invention were prepared.

A particle size analysis of the powder in alloy 8009 was conducted according to standard ISO 1332 using a Malvern 2000 particle size analyzer. The curve describing the evolution in the volume fraction as a function of the diameter of the particles forming the powder describes a distribution similar to a Gaussian distribution. If $d_{10}$, $d_{50}$ and $d_{90}$ respectively represent the fractiles at 10%, at 50% (median) and at 90% of the distribution obtained, a rate of uniformity $$\sigma = \frac{d_{90} - d_{10}}{d_{50}}$$

and a standard deviation $$\varepsilon = \frac{d_{90}}{d_{10}}$$

can be defined. For the powder considered, $\sigma=4.1\pm0.1\%$ and $\varepsilon=1.5\pm0.1\%$ were measured. The value $d_{10}$, $d_{50}$ and $d_{90}$ were respectively, 33.5 µm, 52.3 µm and 81.2 µm.

The alloyed powder according to the invention was obtained by mixing powder in alloy 8009 and a silicon powder of granulometry from 10 to 45 µm.

The composition of the parts manufactured was determined by ICP-OES and is given as a percentage of the weight fraction in the following table.

TABLE 1

|  | Si | Fe | Mn | V |
| --- | --- | --- | --- | --- |
| Invention | 6.8 | 8.2 | 0.19 | 1.1 |
| 8009 | 1.8 | 8.4 | 0.23 | 1.2 |

In the tests that follow, the laser source 31 is a Nd/Yag laser with a power of 400 W.

Cubic parallelepipeds, of dimension 1 cm×1 cm×1 cm were formed according to this method, by UTBM (University of Technology of Belfort Montbéliard), by stacking various layers formed.

Various conditions of energy density of the source laser 31 and of the speed of movement of the beam 32 impacting the powder 25 were tested. The level of porosity of the cubes obtained was observed and the results were ranked using an index from 1 to 4 (1: low porosity, 4: high porosity). The relation between the energy density E and the parameters of the method is known to those skilled in the art and can for example be found in the equation (2) of the reference M. Fisher et al. Materials Science and Engineering C 62 (2016) pages 852-859.

The results are presents in Table 2.

TABLE 2

| Test | E: Energy density (J/mm³) | V: Speed (mm/s) | Porosity index 8009 | Porosity index Invention | 0.2 V − 35 | 0.3 V + 30 |
| --- | --- | --- | --- | --- | --- | --- |
| 1 | 138 | 563 | 3 | 1 | 77.6 | 198.9 |
| 2 | 206 | 563 | 1 | 1 | 77.6 | 198.9 |
| 3 | 92 | 563 | 3 | 1 | 77.6 | 198.9 |
| 4 | 114 | 648 | 4 | 1 | 94.6 | 224.4 |
| 5 | 200 | 417 | 1 | 1 | 48.4 | 155.1 |
| 6 | 120 | 714 | 4 | 1 | 107.8 | 244.2 |
| 7 | 140 | 465 | 3 | 1 | 58 | 169.5 |
| 8 | 210 | 465 | 1 | 1 | 58 | 169.5 |
| 9 | 131 | 507 | 2 | 1 | 66.4 | 182.1 |
| 10 | 153 | 616 | 3 | 1 | 88.2 | 214.8 |
| 11 | 102 | 616 | 2 | 1 | 88.2 | 214.8 |
| 12 | 126 | 507 | 3 | 1 | 66.4 | 182.1 |
| 13 | 189 | 507 | 1 | 1 | 66.4 | 182.1 |
| 14 | 83 | 714 | 3 | 2 | 107.8 | 244.2 |
| 15 | 219 | 465 | 1 | 1 | 58 | 169.5 |
| 16 | 138 | 563 | 2 | 1 | 77.6 | 198.9 |
| 17 | 138 | 563 | 2 | 1 | 77.6 | 198.9 |
| 18 | 138 | 563 | 2 | 1 | 77.6 | 198.9 |

According to the Table 2 hereinabove, the alloy used according to this invention makes it possible to obtain results that are equivalent and even better than those obtained with the alloy 8009 in terms of porosity.

With the SLM method of this example, for many energy density/speed combinations, the alloy used according to the invention makes it possible to obtain a low porosity while the alloy 8009 does not allow so. It is observed in particular that for 0.2 V−35<E<0.3 V+30, the porosity is low for the alloy used according to the invention (level 1) although it is higher for the alloy 8009 (level 2 or higher). For the same energy density, the alloy used according to the invention therefore makes it possible to use a higher speed. It is understood that the equation described in this paragraph can be used only for the SLM method. The values of the energy density E and of speed V, as well as the equation would be different with another method. Those skilled in the art will know how to adapt the energy density E and the speed V in another method for optimizing the energy density-speed pair for the alloy used according to this invention. The advantage of the alloy used according to this invention is that it allows for a wider range of choices for the energy density E and the speed V in order to obtain a satisfactory porosity index. It makes it possible in particular to increase the speed V and/or to decrease the energy density E in relation to the alloy 8009, while still retaining a satisfactory porosity. The method is therefore optimized and productivity is improved.

Measurements of the Vickers hardness Hv0.1 were taken on the parts obtained in the conditions of test 8. The average hardness obtained out of 64 measurements for each part was 181 Hv0.1 for the part according to the invention while it was 158 Hv0.1 for the part obtained with the alloy 8009.

Figure 2A:
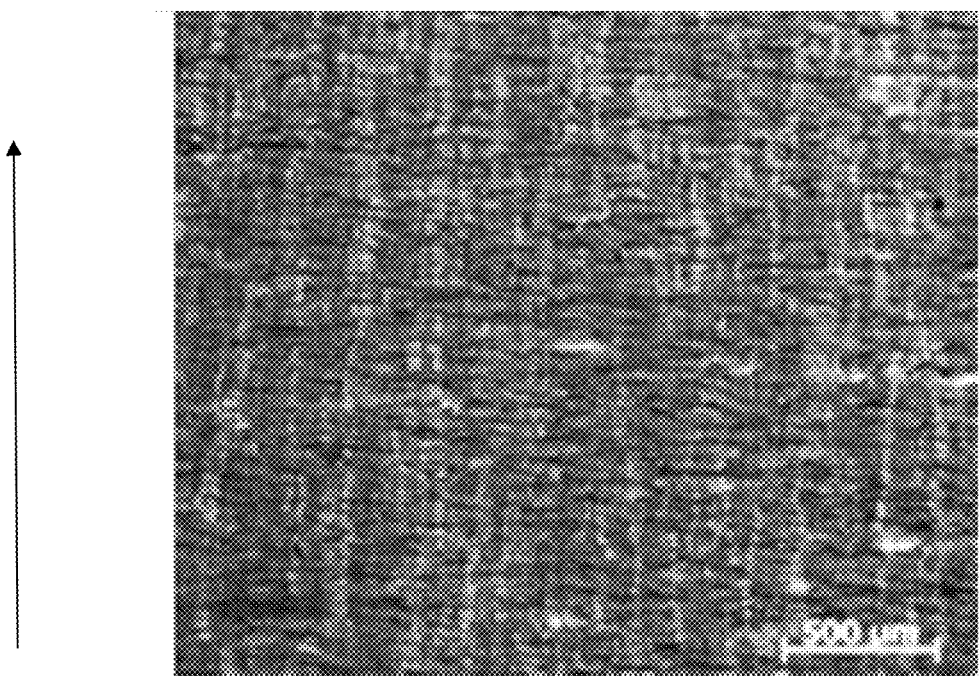
FIG. 2A shows the granular structure obtained with a reference alloy 8009, with the arrow indicating the direction of growth of the part.
Figure 2B:
FIG. 2B shows the granular structure obtained with an alloy according to the invention, with the arrow indicating the direction of growth of the part.

The granular structure was observed after a Barker attack, the results are presented in FIG. 2. The arrow indicates the direction of growth of the part. The granular structure of the part obtained with the alloy 8009 (see FIG. 2A) has a growth via epitaxy of columnar grains parallel to the direction of growth and passing through several layers, of which the dimension can reach a few millimeters. This structure very probably leads to non-isotropic mechanical properties and to the increase in the surface fraction of porosity. On the contrary, the granular structure obtained by the method according to the invention (see FIG. 2B) is thin and does not have columnar grains passing through several couches.

The invention claimed is:

1. A method for manufacturing a part comprising a formation of successive solid metal layers, superimposed on one another, each layer describing a pattern defined from a numerical model (M), each layer being formed by the deposition of a metal, referred to as a filler metal, the filler metal being subjected to an input of energy so as to melt and constitute, by solidifying, said layer, wherein the filler metal takes the form of a powder, of which the exposure to an energy beam results in a melting followed by a solidification in such a way as to form a solid layer,
wherein the filler metal is an aluminum alloy consisting of the following alloying elements:
Si, according to a weight fraction from 4% to 15%;
Fe, according to a weight fraction from 2% to 15%;
V, according to a weight fraction from 0.1% to 5%;
Mn, according to a weight fraction from 0.1% to 2%;
other elements less than 0.05 wt. % each and less than 0.15 wt. % in total; and
remainder aluminum;
or an aluminum alloy consisting of the following alloying elements:
Si, according to a weight fraction from 4% to 15%;
Fe, according to a weight fraction from 2% to 15%;
V, according to a weight fraction from 0.1% to 5%;
Mn, according to a weight fraction from 0.1% to 2%;
at least one element selected from the group consisting of Ti, Zr, Cr, Hf, Ag, Li, Zn, Mg, W, Nb, Ta, Y, Yb, Nd, Er, Co, Ni, La, Ce, mishmetal, Bi, Sr, Ba, Ca, Sb, P, and B;
other elements less than 0.05 wt. % each and less than 0.15 wt. % in total; and
remainder aluminum;
wherein the part comprises, in a raw state of manufacture, a Vickers hardness Hv0.1 of at least 160.

2. The method according to claim 1, wherein at least one of the following elements is present in the aluminum alloy:
Ti, according to a weight fraction from 0.01% to 5%;
Zr, according to a weight fraction from 0.05% to 5%;
Cr, according to a weight fraction from 0.05% to 5%;
Hf, according to a weight fraction from 0.05% to 5%.

3. The method according to claim 2, wherein at least one of the following elements is present in the aluminum alloy:
Ti, according to a weight fraction from 0.1% to 1%;
Zr, according to a weight fraction from 0.1% to 2%;
Cr, according to a weight fraction from 0.1% to 2%;
Hf, according to a weight fraction from 0.1% to 2%.

4. The method according to claim 1, wherein at least one of the following elements is present in the aluminum alloy:
Ag, according to a weight fraction from 0.1 to 1%;
Li, according to a weight fraction from 0.1 to 2%;
Zn, according to a weight fraction from 0.1 to 1%.

5. The method according to claim 1, wherein Mg according to a weight fraction from 0.1 to 7% is present in the aluminum alloy.

6. The method according to claim 5, wherein Mg according to a weight fraction from 0.5 to 5% is present in the aluminum alloy.

7. The method according to claim 1, wherein at least one of the following elements is present in the aluminum alloy:
W, Nb, Ta, Y, Yb, Nd, Er, with a weight fraction of at least 0.1% and of at most 5%.

8. The method according to claim 7, wherein:
W, Nb, Ta, Y, Yb, Nd, Er, with a fraction of at least 0.1% and of at most 2%.

9. The method according to claim 1 wherein at least one element chosen from among Co and Ni with a weight fraction of at least 0.1% and of at most 7% is present in the aluminum alloy.

10. The method according to claim 1, wherein at least one of the following elements is present in the aluminum alloy:
La, Ce or mishmetal, with a weight fraction of at least 0.1% and of at most 12%.

11. The method according to claim 10, wherein:
La, Ce or mishmetal, with a weight fraction of at least 0.1% and of at most 2%.

12. The method according to claim 1, wherein at least one of the following elements is present in the aluminum alloy:
Bi, Sr, Ba, Ca, Sb, P and B, with a weight fraction of at least 0.01% and of at most 1%.

13. The method according to claim 1, further comprising, after the formation of the layers,
a solution heat treatment followed by quenching and aging, or
a heat treatment typically at a temperature of at least 100° C. and of at most 400° C.,
and/or a hot isostatic compression.

14. A metal part obtained by the method of claim 1.

15. A powder comprising an aluminum alloy consisting of the following alloying elements:
Si, according to a weight fraction from 4% to 15%;
Fe, according to a weight fraction from 2% to 15%;
V, according to a weight fraction from 0.1% to 5%;
Mn, according to a weight fraction from 0.1% to 2%;
other elements less than 0.05 wt. %, each and less than 0.15 wt. % in total; and
remainder aluminum;
or an aluminum alloy consisting of the following alloying elements:
Si, according to a weight fraction from 4% to 15%;
Fe, according to a weight fraction from 2% to 15%;
V, according to a weight fraction from 0.1% to 5%;
Mn, according to a weight fraction from 0.1% to 2%;
at least one element chosen from among: Ti, Zr, Cr, Hf, Ag, Li, Zn, Mg, W, Nb, Ta, Y, Yb, Nd, Er, Co, Ni, La, Ce, mishmetal, Bi, Sr, Ba, Ca, Sb, P, B;
other elements less than 0.05 wt. %, each and less than 0.15 wt. % in total; and
remainder aluminum.

16. The powder according to claim 15, wherein:
the Mn is present according to a weight fraction from 0.1% to 0.3%.

17. The method according to claim 1, wherein:
Si, according to a weight fraction from 5% to 8%;
Fe, according to a weight fraction from 6% to 10%;
V, according to a weight fraction from 0.1-2%;
Mn, according to a weight fraction of 0.1-1%.

18. The method according to claim 1, wherein:
Si, according to a weight fraction from 6% to 7%;
Fe, according to a weight fraction from 8% to 9%;
V, according to a weight fraction from 1-1.5%;
Mn, according to a weight fraction of 0.1-0.5%.

19. The method according to claim 1, wherein the part comprises, in a raw state of manufacture, a Vickers hardness Hv0.1 of at least 180.

20. The method according to claim 1, wherein:
the Mn is present according to a weight fraction from 0.1% to 0.3%.

* * * * *